United States Patent [19]

Lewis

[11] 4,102,054

[45] Jul. 25, 1978

[54] SUNDIAL

[75] Inventor: Kemp S. Lewis, Tulsa, Okla.

[73] Assignees: Danny R. Williams; Kenneth D. McPhail, both of Bartlesville, Okla.

[21] Appl. No.: 791,719

[22] Filed: Apr. 28, 1977

[51] Int. Cl.[2] .................... G01C 21/02; G01C 17/34

[52] U.S. Cl. .................................. 33/270; 33/1 SC

[58] Field of Search ................ 33/269, 270, 271, 1 SC

[56] References Cited

U.S. PATENT DOCUMENTS

| | | | |
|---|---|---|---|
| 281,527 | 7/1883 | Larsen | 33/270 |
| 1,146,412 | 7/1915 | Early | 33/270 |
| 2,192,750 | 3/1940 | Mead | 33/270 |
| 2,754,593 | 7/1956 | Sundblad | 33/270 |
| 3,110,108 | 11/1963 | Sundblad | 33/270 |

FOREIGN PATENT DOCUMENTS

| | | | |
|---|---|---|---|
| 1,773,706 | 12/1971 | Fed. Rep. of Germany | 33/270 |

*Primary Examiner*—William D. Martin, Jr.
*Attorney, Agent, or Firm*—Head, Johnson & Chafin

[57] ABSTRACT

A sundial which is adjustable with respect to its mounting location to correct for its earth location in both longitude and latitude. The sundial is provided with solar time equation indicia and indicator to correct real solar time to mean solar time and includes further indicia to determine the calendar date based on sun declination.

9 Claims, 4 Drawing Figures

SUNDIAL

BACKGROUND OF THE INVENTION

1. Field of the Invention

The present invention relates to an improvement in a sundial and more particularly, but not by way of limitation, to a sundial which is correctable with regard to its mounting location and is further correctable for adjusting real solar time to mean solar time and to compensate for legal time such as daylight savings time.

2. Description of the Prior Art

Various types of sundials and celestial observation instruments have been in use for centuries, and with each refinement of these instruments, man has learned more about the movement of the earth with respect to other celestial bodies.

The development of the calendar and, subsequently the present day clocks, are the result of many years of observation, study, and trial and error tests in an attempt to define an an arbitrary time interval which is useful in determining the happening events, and at the same time coincide with the periodic movement of the earth with respect to the stars and particularly earth's sun.

However, our timekeeping system accurate as it may be does not accurately coincide with the movement of the earth with respect to the sun. We have defined a day as being the time required for the earth to rotate about its axis one time with respect to the sun.

Even though the earth's rotation with respect to far away stars is fairly constant, its rotation with respect to the sun is not. A rather large deviation is due to the fact that the earth revolves around the sun, not in a circular orbit, but in an elliptical orbit with the sun substantially located at one of the foci of the ellipse. The elliptical orbit follows Kepler's laws of planetary motion and the earth moves at a greater velocity when near the perihelion of its orbit than when near the aphelion. Therefore, since the earth's rotation about its own axis is at a rather constant velocity, the real solar day or the interval between two successive identical positions of the sun with respect to the earth varies as the earth moves along its elliptical path. Hence, a mean solar day was defined as being equal to 24 hours where the hour is based on the length of a mean solar day, averaging said lengths over a year's period of time.

Therefore, the mean solar day coincides with a real solar day only at certain positions on its elliptical path. The positions where real solar time coincides with mean solar time occurs near the dates of Dec. 24, Apr. 14, June 15, and Sept. 2. Between Dec. 24 and Apr. 14, mean solar time leads real solar time by as much as 13 minutes. Between Apr. 14 and June 15, mean solar time trails or lags behind real solar time by as much as 13½ minutes. Between June 15 and Sept. 2, mean solar time again leads real solar time by as much as 6½ minutes, and between Sept. 1 and Dec. 24, mean solar time again lags behind real solar time by as much as 15½ minutes.

Further, since there is a mean solar time change of 1 hour corresponding to every 15° of displacement of longitude from the Greenwich meridian, it would be impractical for one to compensate for his exact longitudinal position. Thus, one hour time zones have been established which are approximately 15° in longitude apart around the entire globe. Therefore, if one is situated at Tulsa, Oklahoma which is approximately 96° longitude west or 6° west of the U.S. standard 90° west meridian, his clock would be 6/15 hour or 24 minutes ahead of mean solar time. Hence, a typical sundial located in Tulsa, Oklahoma, to measure solar time, would indicate approximately 11:36 a.m. while an observer's clock would indicate 12 o'clock noon Presently available sundials, while possible adjustable with respect to latitude location, are not capable of being adjusted to either mean solar time or locations within a time zone. Neither are such known sundials capable of adjustment for legal time changes such as daylight savings time.

SUMMARY OF THE PRESENT INVENTION

The present invention provides a sundial constructed such that the time calibrations may be adjusted such that the shadow cast will indicate mean solar time within the time zone and at the latitude of the sundial's location. A second shadow cast will provide the approximate calendar date and a means for correcting real solar time to mean solar time.

Since the earth's axis is tilted approximately 23.5° from perpendicular to the plane of its orbit, the sun appears to oscillate between the latitudes 23.5° south and 23.5° north. This oscillation corresponds with the earth's seasons and is measurable by the length of the shadow cast at any known latitude. This apparent solar position with respect to the tilt of the earth's axis will be hereinafter referred as the sun's declination.

By comparing the sun's declination with the error due to the difference between real solar and mean solar time, one arrives at the "equation of time" which when plotted against the calendar dates yields a curve known as the analemma curve which will be hereinafter more fully described.

The present invention comprises a pair of mutually perpendicular arcuate members which are semi-circular in shape and connected at right angles at their midpoints. The ends of the members are subtended by cords which intersect at their centers at right angles. The first member's concave surface is provided with data calibrations on either side of its midpoint ranging from Dec. 22 (greatest sun declination, minus 23.5°) to June 22 (smallest sun declination, plus 23.5°). The calibrations of approximately March 21 and Sept. 22 lie on the midpoint.

The first member is also provided with a slot along the arc of its curve so that it may be mounted at a particular latitude so that the cord between its end points is in substantial alignment with the North Star, Polaris and is therefore parallel to the earth's axis.

The second member is provided with an arcuate slip ring which is slidable within a centrally disposed longitudinal groove along the entire length of the second member such that the slip ring will slide longitudinally along the arc curve. The concave surface of the slip ring is provided with time calibrations therealong corresponding to the daytime hours, 12 o'clock noon being at the midpoint thereof. The slip ring is also provided with a moveable indicia which is moveable along the surface thereof and is securable at any desired point for a purpose that will be hereinafter set forth.

Inscribed upon the surface of the data of calibrations of the first member is the analemma curve. The scales of the analemma curve is compatible with the data calibrations and also with the time calibrations of the slip ring.

When the sundial is properly mounted at any given latitude such that the first member cord is in alignment with the star, Polaris, the moveable indicia of the slip ring may be adjusted to compensate for the number of degrees of longitude displacement from a standard time meridian. For example, if the device is located at longitude 96° west, which is 6° west of the standard 90° west longitude, the indicia is moved to the right of the 12 o'clock noon mark by an amount equal to 6/15 hour or 24 minutes. Naturally, if the device were set up on the 90° west longitude mark the indicia on the slip ring would be directly in line with the 12 o'clock mark. After the indicia has been properly set and secured in place, the user simply moves the slip ring such that the indicia is located directly below, or above as the case may be, the intersection between the date marking and the analemma curve. Thus, the slip ring is then established in position for that particular date to compensate for the error introduced by the orbital position of the curve with respect to the sun.

It is noted that one need only know the approximate date in order to establish the correct date by means of the sundial itself. Stated another way, the observer may simply note the position of the shadow cast by the horizontal cord, at or about solar noon, onto the first semi-circular member which will lie across the particular day of the year. This shadow will also provide the exact intersection of the date with the analemma curve for positioning the slip ring. After the above settings have been accomplished, the user reads the time display from the shadow cast by the north/south cord or rod which gives the clock time for that particular time zone.

Therefore, it is apparent that the above invention provides a sundial which has some use as a calendar and likewise may be adjusted to compensate for the position of the sundial with respect to both latitude and longitude and further to compensate for the difference between real solar time and mean solar time such that the reading of the sundial may be in direct accordance with an ordinary clock reading, for any position throughout a particular time zone. It is also seen that during daylight savings time, the indicia located on the slip ring may be moved one hour to the right and still used in the same manner to read out clock time.

DESCRIPTION OF THE DRAWINGS

Other further advantageous features of the present invention will hereinafter more fully appear in connection with a detailed description of the drawings in which.

DESCRIPTION OF THE PREFERRED EMBODIMENT

Figure 1:
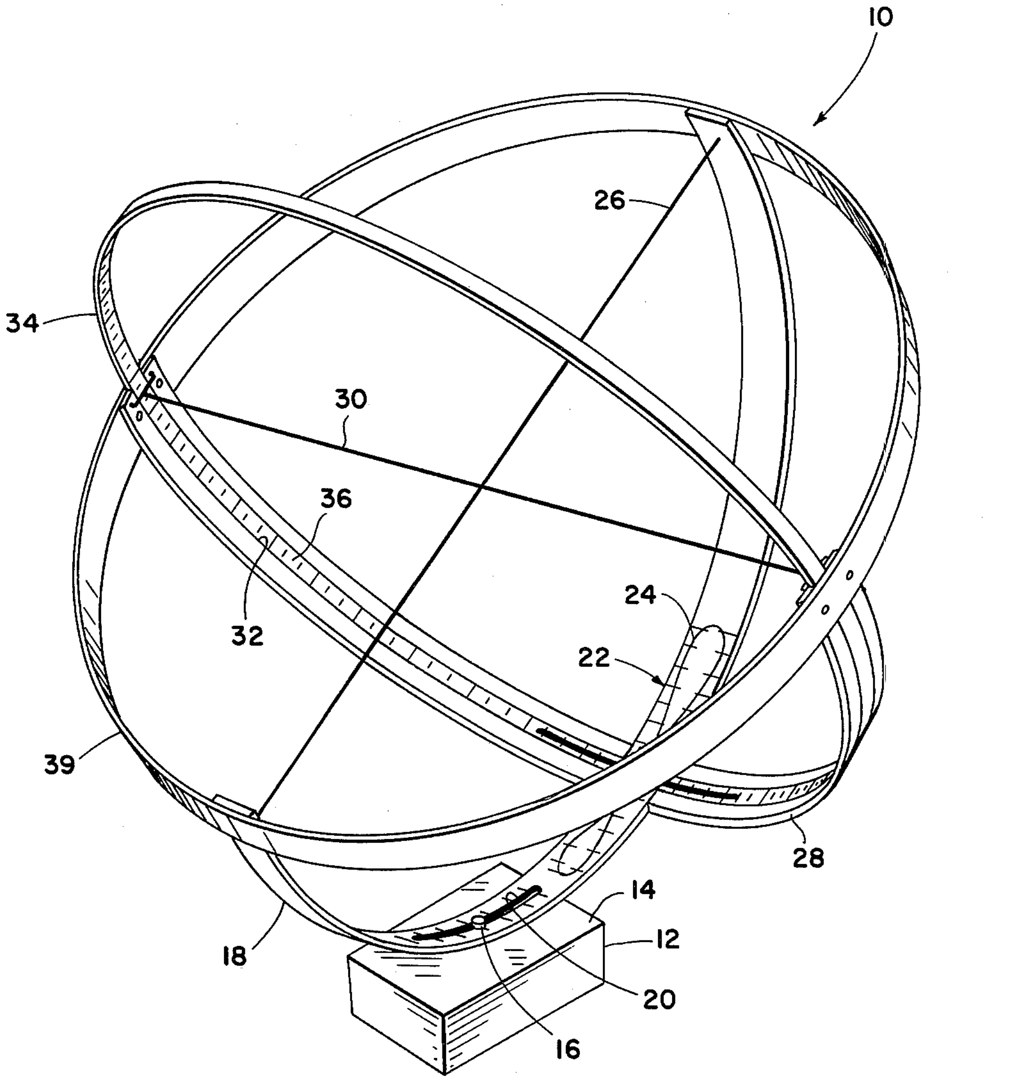
FIG. 1 is a perspective view of a sundial embodying the present invention.

Referring to the drawings in detail, reference character 10 generally indicates a sundial which may be mounted on any suitable pedestal 12. The pedestal 12 is provided with a flat top surface or horizontal surface 14 having a suitable threaded bore for receiving a bolt 16 therein. The sundial 10 comprises a first semi-circular member 18 having an elongated mounting slot 20 therein for receiving the bolt 16 therethrough. The inside or concave surface of the arcuate member 18 is provided with a plurality of date indicia generally indicated by reference character 22 on either side of the mid-portion thereof. Inscribed over the date indicia, is an analema curve 24 which will be hereinafter more fully described. The other ends of the arcuate member 18 are connected by means of a straight cord or rod member 26.

A second semi-circular member 28 is secured to the first member 18 at the midpoint thereof and at right angles thereto. The outer ends of the semi-circular member 28 are provided with an elongated straight rod or cord member 30 therebetween which member 30 intersects the cord or rod member 26 at its centerpoint and at right angles. The semi-circular member 28 is also provided with a groove or slot 32 throughout the entire length of said member 28 for receiving an elongated arcuate slip ring 34 therein. The slip ring 34 may be circular in shape as shown or may include only a portion of the circle and is provided with a plurality of equally spaced time indicia 36 therealong. The ring 34 is slidable with respect to the semi-circular member 28.

Figure 3:
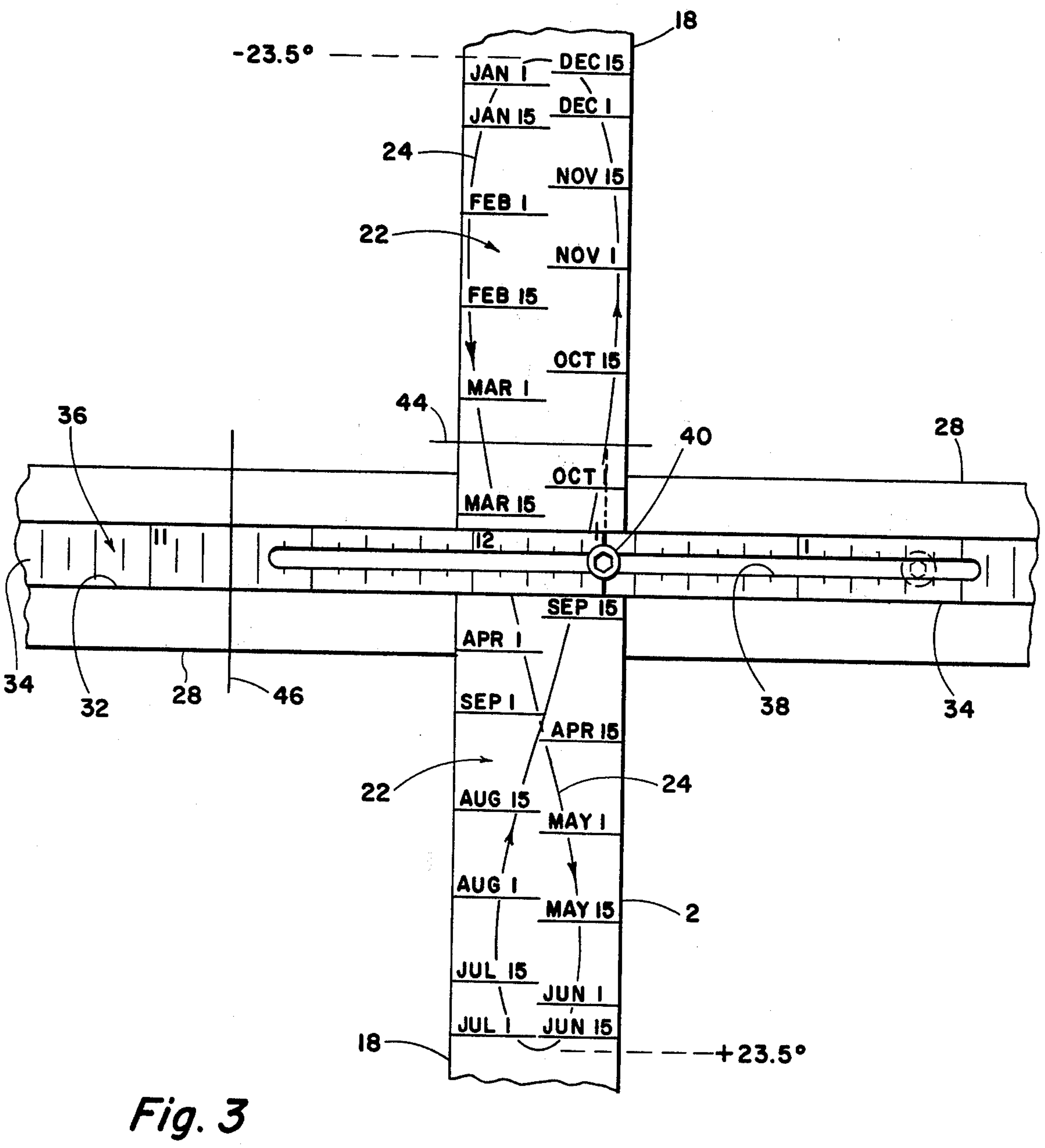
FIG. 3 is a partial detail of the intersecting memb ers of the sundial of FIG. 1.

Referring to FIG. 3, the slip ring 34 is also provided with an elongated centrally disposed slot 38 which carries a moveable indicator member 40 therein. The indicator 40 is slidable along the slot 38 and may be selectively tightened or fixed at any desired location within the said slot 38.

It is noted that the indicia 22 which is inscribed on either side of the center portion of the semi-circular member 18 ranges from approximately December 22 through approximately September 1 on the left side of the member. The markings for September 1 through December 22 are on the right side of the scale. This alignment is in conjunction with the analemma curve 24 such that when the sun or when real solar time is behind mean solar time, those dates appear on the left side of center and when the sun loads mean solar time, those dates appear on the right side of center. It is further noted that the width of the scale for the analemma curve is in accordance with the scale of the time indicia appearing on the slip ring 34.

Figure 2:
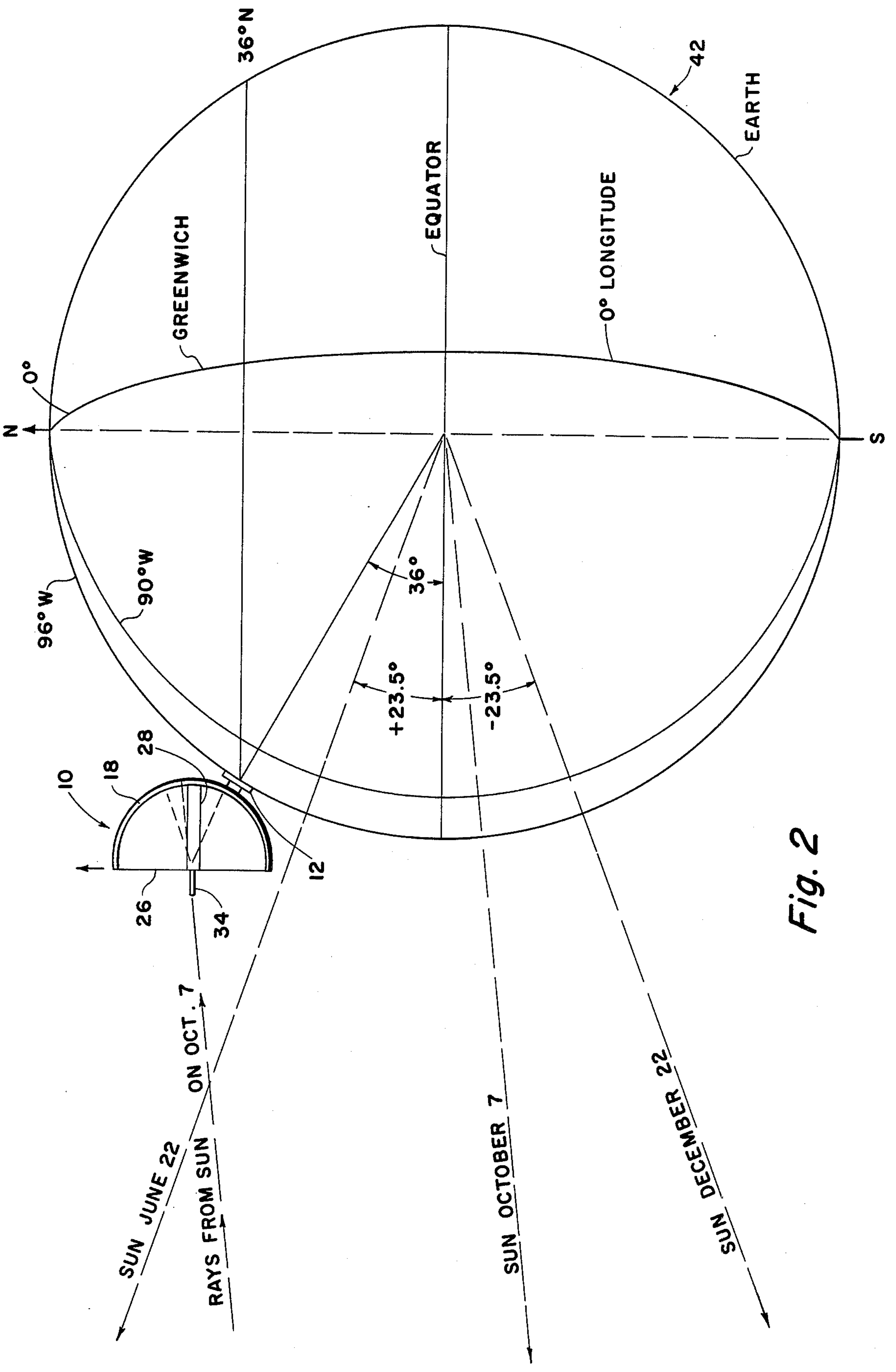
FIG. 2 is a diagrammatic drawing of the earth having the sundial in FIG. 1 thereon.

Referring now to FIG. 2, reference character 42 represents a diagram of the earth showing north and south poles with the equator and at least one latitude marking which represents approximately 35° north latitude. Also, shown emanating from the centerpoint of the drawing are the ranges of sun declination of plus and minus 23.5°. Located at the 35° latitude mark and at a separate mark depicting 96° west longitude is the sundial 10.

For purposes of describing the operation of the sundial 10, consider the sundial being set up in the Tulsa, Oklahoma area which is located at approximately, latitude 36° north and longitude 96° west. The pedestal 12 is mounted with the flat surface 14 as shown in FIG. 1 being horizontal and the semi-circular member 18 is attached thereto by means of the bolt 16 and cooperating slot 20. The semi-circular member 18 is adjusted so that the bolt 16 lies 36° in arc from the center of the said semi-circular member 18. The plane of the semi-circular member 18 is then rotated about the bolt 16 using the bolt 16 as an axis of rotation such that said plane is in direct alignment with true north. The bolt 16 is then tightened into place to firmly lock the sundial into the position described. Referring to FIG. 2, we can see the sundial locked into the position described, the rod or cord 26 being in alignment with the star Polaris or stated another way, the cord 26 is parallel to the rotational axis of the earth. Therefore, the sundial has now been completely adjusted to compensate for the latitude of its mounting position.

It is noted at this point that the slot 20 and cooperating bolt 16 may be in the form of a sliding bracket so that the bracket may be slid completely throughout the arc of the semi-circular member 18 so that the sundial may be located anywhere in the northern or southern hemisphere, or even on the equator.

Referring now to FIG. 3, an adjustment is now required for the longitudinal position of the sundial which for purposes of this example will be 96° west longitude. As hereinbefore set forth, since 96° west is 6° west of the Central Standard Time meridian of 90° west, an adjustment will need to be made to compensate for 6/15 of an hour or 24 minutes. Referring now to FIG. 3, the moveable indicia marker 40 is loosened and moved to the right of the 12 o'clock mark by an amount equivalent to 24 minutes in time. The moveable indicia marker 40 is then tightened into place with respect to the slip ring 34. This adjustment compensates for the longitude position of the sundial, so that the sundial may be directly read to indicate actual clock time at its particular longitudinal location within the central standard time zone. Naturally, if the period is during the summer months in the United States, and wherein daylight savings time is in effect the indicia marker will be moved one hour to the right of its above location or 24 minutes to the right of the 1:00 p.m. indicia as shown in the dashed lines in FIG. 3.

Since the date calibrations are inscribed on the concave face of the semi-circular member 18 and is scaled to coincide with the sun's declination, the shadow cast on said date calibration due to the rod or cord 30 at or about solar noon will coincide with the date during the year. For instance, if we take the arbitrary date of Oct. 7, for any particular year, we can interpolate between the marks for Oct. 1, and Oct. 15 as shown in FIG. 3 and indicated by reference character 44. It is further seen that the shadow cast at solar noon on Oct. 7 will lie at reference character 44. The slip ring 34 then is moved so that the indicia marker 40 which is affixed thereto is located directly below the intersection of the date line 44 and the analemma curve 24 as shown in FIG. 3. This operation therefore compensates for the difference between real solar time and mean solar time so that a shadow cast by the rod or cord 26 on the time calibration indicia 36 will reveal mean solar time corrected to the sundial's longitudinal position within a time zone to read directly clock time for that particular moment. For instance, at 11:15 a.m., the shadow cast by the rod 26 will lie across the slip ring 34 as shown and indicated by reference character 46. This time indication will coincide with clock time for the location in the Tulsa, Oklhaoma area.

Figure 4:
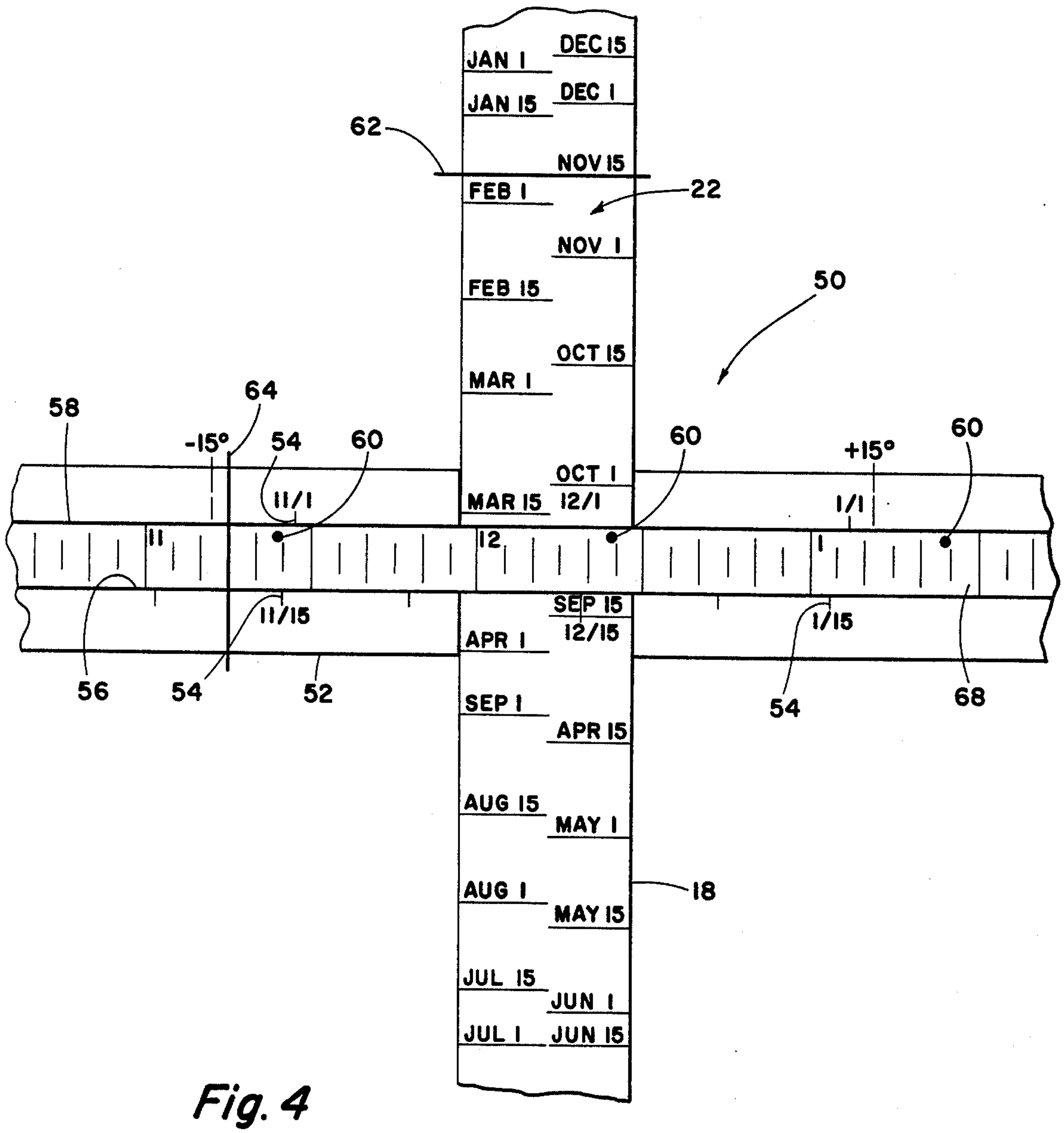
FIG. 4 is a partial detail of the intersecting member of a second embodiment of the invention.

Referring now to FIG. 4, reference character 50 generally indicates an alternate version of the sundial 10 wherein the semi-circular member 18 is provided with the same plurality of date markings 22 but is not provided with the analemma curve 24 as shown in FIG. 3. Further, it is noted that the sundial apparatus 50, while having a second semi-circular member 52 which is identical to construction to the semi-circular member 28, is provided with a plurality of mean solar time correction indicia indicated by reference character 54. Semi-circular member 52 also has a longitudinal slot or groove 56 running throughout the entire length thereof for slidably carrying a slip ring 58 therein. The slip ring 58 is provided with a plurality of time indicia 68 which are similar to the time indicia 34 of the sundial 10. However, the slip ring member 58 is not provided with a slot and moveable indicia marker as is the case with the sundial 10.

The mean solar time correction indicia 54 as shown has a mark for the first day and the 15th day of each month corresponding to the date indicia 22 on the semi-circular member 18. However in this case, the date indicia for November 1, is located near the time indicia for 11 o'clock found on the slip ring. Likewise for each calendar month, there are two correction indicia 54 located near the time indicia ranging from one to twelve. The spacing of the correction indicia 54 is in accordance with the equation of time or the analemma curve. For instance, on the dates of Nov. 1 and 15, the sun is fast by approximately 15½ minutes and 15 minutes, respectively. Therefore, the indicia as shown in FIG. 4, for November 1 and November 15 are offset to the right of −15°, by 15½ minutes (4°) and 15 minutes (3,75°)respectively. Likewise, since on Jan. 1 and 15 the sun is slow by approximately 4 minutes and 10 minutes, respectively. The indicia for Nov. 1 and Nov. 15 are offset to the left of +15° by 4 minutes (0.3°) and 10 minutes (1.7°) respectively.

Therefore, the operation of the sundial 50 is as follows: The sundial is set up to compensate for latitude in the same way as the sundial 10. However, if the longitude is 6° from the west of the standard time meridian longitude as in the prior case, a small mark will be made on the slip ring to the right of each hour marker by an amount of 24 minutes corresponding to the 6° displacement in the time zone. These markers are shown by reference character 60 FIG. 4. Taking an example case of finding the time on approximately November 15, it will be noted that the shadow cast by the cord 30 as indicated by reference character 62 falls across the semi-circular member 18 adjacent the date indicia for November 15 only at or about solar noon. The slip ring 58 is adjusted such that the corrected marker 60 for 11 o'clock is in direct alignment with the correction indicia Nov. 15 as shown in FIG. 4. Then if the clock time is 11:15, the shadow cast by the cord 26 will fall across the semi-circular member 52 and the slip ring 58 at the 11:15 a.m. position as shown and indicated by reference character 64. Any interpolation of the date is done on the date correction indicia.

Therefore, it is seen that, although in the embodiment of the sundial 50 the analemma curve is not actually inscribed on the sundial itself, the curve is plotted along the semi-circular member 52 by means of the correction indicia 54.

From the foregoing, it is apparent that the present invention provides a sundial for reading correct clock time regardless of its physical location on the earth.

Whereas, the present invention has been described in particular relation to the drawings attached hereto, other and further modifications apart from those shown or suggested herein may be made within the spirit and scope of the invention.

What is claimed:

1. An adjustable sundial comprising:

(a) a first semi-circular member, a straight cord means subtended between the ends of the first semi-circular member, date calibrations inscribed on the concave surface of the first member extending approximately plus or minus 23.5° about the midpoint of the first semi-circular member, and having spacing corresponding to the sun's declination;

(b) a second semi-circular member of substantially the same size as the first member, the midpoint of the second member being secured to the midpoint of the first member and at a right angle with respect thereto, a second straight cord means subtended between the ends of the second member and crossing said first cord means at a right angle with respect thereto;

(c) a circular segment slip ring member having the same radius and curvature as the second member reciprocally disposed on the concave surface of said second member, a plurality of equally spaced time calibrations ranging from morning to evening on the concave surface of said slip ring, the 12 o'clock indicia being located near the midpoint thereof; and (d) sun declination adjusting means carried by the sundial and cooperating with the slip ring member for correcting the time according to the sun's declination.

2. A sundial as set forth in claim 1 whrein the second semi-circular member is provided with an elongated groove along the entire length of the concave surface thereof for reciprocally receiving the slip ring member therein.

3. A sundial as set forth in claim 1 wherein the first semi-circular member is provided with an adjustable mounting means for securing the sundial to a stationary object, said mounting means being adjustable along its semi-circular arc to compensate for a particular mounting latitude.

4. A sundial as set forth in claim 3 whrein the mounting means is an elongated slot having threaded attachment means reciprocally carried thereby.

5. A sundial as set forth in claim 4 wherein the sun declination adjustment means comprises a plurality of second calibrations spaced along the second semi-circular member, at least one said calibration for each of the twelve calendar months, each said calibration being positioned near a corresponding time calibration on the moveable slip member, the spacing of said second date calibrations with respect to said time calibrations being based on the error due to the earth's position in orbit and related to the sun's declination.

6. A sundial as set forth in claim 1 whrein the date calibrations are divided on either side of the concave surface of the first semi-circular member with the dates from approximately Dec. 2, to Apr. 14 and from approximately June 22 to Aug. 14 being on one side with the remaining dates on the opposite.

7. A sundial as set forth in claim 6 wherein the sun declination adjustment means comprises an analemma time equation curve described on the first concave surface of the first semi-circular member superimposed with the said date calibrations, the scale of the width of said analemma curve cooperating with the spacing of the time calibrations on said slip ring member whereby, depending on the sun's declination and the time equation curve associated therewith, the slip ring member may be adjusted to correct solar time to mean solar time indicated by the sun so that clock time may be read directly.

8. A sundial as set forth in claim 7 including longitudinal time zone correction means comprising a moveable indicator slidably carried by the slip ring member.

9. A sundial as set forth in claim 7 wherein the longitudinal time zone correction means comprises an elongated slot provided in the slip ring member on either side of the 12 o'clock indicia and a moveable indicator carried within said slot and adjustable throughout the length of said slot.

* * * * *